US010996131B2

(12) United States Patent
McQuade et al.

(10) Patent No.: US 10,996,131 B2
(45) Date of Patent: May 4, 2021

(54) REFRIGERANT GAS SENSING SYSTEM (71) Applicant: Johnson Controls Technology Company, Auburn Hills, MI (US)

(72) Inventors: William F. McQuade, New Cumberland, PA (US); Neelkanth Gupte, Katy, TX (US)

(73) Assignee: Johnson Controls Technology Company, Auburn Hills, MI (US)

(*) Notice: Subject to any disclaimer, the term of this patent is extended or adjusted under 35 U.S.C. 154(b) by 392 days.

(21) Appl. No.: 15/871,681

(22) Filed: Jan. 15, 2018

(65) Prior Publication Data
US 2019/0170598 A1 Jun. 6, 2019

Related U.S. Application Data (60) Provisional application No. 62/593,589, filed on Dec. 1, 2017.

(51) Int. Cl.
*G01M 3/16* (2006.01)
*F25B 49/00* (2006.01)
(Continued)

(52) U.S. Cl.
CPC .............. *G01M 3/16* (2013.01); *F25B 49/005* (2013.01); *G01M 3/20* (2013.01); *G01M 3/207* (2013.01);
(Continued)

(58) Field of Classification Search
CPC ............ F25B 2500/22; F25B 2500/221; F25B 2500/23; F25B 2500/24; F25B 2500/32; F25B 2500/222; G01M 3/007
(Continued)

(56) References Cited

U.S. PATENT DOCUMENTS 5,073,753 A * 12/1991 Collings .............. G01N 27/626
324/464
8,070,355 B2  12/2011 Minor et al.
(Continued)

FOREIGN PATENT DOCUMENTS

EP   2686611 B1   9/2015
EP   3112438 A1   1/2017
WO   2016029003 A1   2/2016

OTHER PUBLICATIONS

Tang, Yanjun et al., "Detection of Femtomolar Concentrations of HF Using an SiO2 Microcantilever", (Abstract) 2004 American Chemical Society, Mar. 25, 2004, Anal. Chem., 2004, 76 (9), pp. 2478-2481.
(Continued)

*Primary Examiner* — Nelson J Nieves
*Assistant Examiner* — Meraj A Shaikh
(74) *Attorney, Agent, or Firm* — Fletcher Yoder, P.C.

(57) ABSTRACT

A refrigerant gas sensing system of a heating, ventilating, and air conditioning (HVAC) system, wherein the refrigerant gas sensing system is configured to collect a sample from a monitored gas volume, to introduce an ignition source to the sample, to detect an amount of combustion product in the sample after ignition, to determine an amount of leaked refrigerant in the monitored gas volume based on the measured amount of combustion product, and to indicate the amount of leaked refrigerant in the monitored gas volume.

31 Claims, 7 Drawing Sheets

(51) Int. Cl.
*G01M 3/20* (2006.01)
*G01M 3/38* (2006.01)

(52) U.S. Cl.
CPC ......... *G01M 3/38* (2013.01); *F25B 2500/222* (2013.01)

(58) Field of Classification Search
USPC .......................................................... 62/127
See application file for complete search history.

(56) References Cited

U.S. PATENT DOCUMENTS

| | | | |
|---|---|---|---|
| 2004/0252307 A1* | 12/2004 | Arno ...................... | G01N 21/78 356/437 |
| 2005/0238533 A1* | 10/2005 | Jansen ................... | G01N 21/72 422/54 |
| 2008/0006775 A1* | 1/2008 | Arno ...................... | G01N 21/05 250/338.5 |
| 2012/0090383 A1* | 4/2012 | Lopez ................... | G01M 3/228 73/40.7 |
| 2013/0213068 A1* | 8/2013 | Goel ..................... | F25B 49/005 62/129 |
| 2016/0178229 A1* | 6/2016 | Chen ........................ | F24F 11/36 62/56 |
| 2017/0059509 A1 | 3/2017 | Sommer et al. | |
| 2018/0120194 A1* | 5/2018 | Roth ................... | G01M 3/2815 |

OTHER PUBLICATIONS

"Development of a Technology That Detects Only Fluorine-containing Gases Whose Biological Effects Are a Concern", Feb. 15, 2017, http://www.scienceandtechnologyresearchnews.com/development-technology-detects-fluorine-containing-gases-whose-biological-effects-concern/.

* cited by examiner

REFRIGERANT GAS SENSING SYSTEM

CROSS-REFERENCE TO RELATED APPLICATION

This application is a Non-Provisional application claiming priority to U.S. Provisional Application No. 62/593,589, entitled "REFRIGERANT GAS SENSING SYSTEM," filed Dec. 1, 2017, which is hereby incorporated by reference in its entirety for all purposes.

BACKGROUND

The present disclosure relates generally to heating, ventilating, and air conditioning systems (HVAC) and, more particularly, to a refrigerant gas sensing system for a HVAC system.

Residential, light commercial, commercial, and industrial HVAC systems are used to control temperatures and air quality in residences and buildings. Generally, the HVAC systems may circulate a refrigerant through a closed refrigeration circuit between an evaporator, where the refrigerant absorbs heat, and a condenser, where the refrigerant releases heat. The refrigerant flowing within the refrigeration circuit is generally formulated to undergo phase changes within the normal operating temperatures and pressures of the system so that quantities of heat can be exchanged by virtue of the latent heat of vaporization of the refrigerant. As such, the refrigerant flowing within a HVAC system travels through multiple conduits and components of the refrigeration circuit. Inasmuch as refrigerant leaks compromise system performance or result in increased costs, for example, maintenance and/or operating costs, it is accordingly desirable to provide detection and response systems and methods for the HVAC system to reliably detect and respond to any refrigerant leaks of the HVAC system.

SUMMARY

In one embodiment, the present disclosure relates to a refrigerant gas sensing system of a heating, ventilating, and air conditioning (HVAC) system, wherein the refrigerant gas sensing system is configured to collect a sample from a monitored gas volume, to introduce an ignition source to the sample, to detect an amount of combustion product in the sample after ignition, to determine an amount of leaked refrigerant in the monitored gas volume based on the measured amount of combustion product, and to indicate the amount of leaked refrigerant in the monitored gas volume.

A heating, ventilating, and air conditioning (HVAC) system having a refrigerant gas sensing system, wherein the refrigerant gas sensing system includes a sample preparation unit configured to collect a sample of gas from a monitored gas volume and prepare the sample for introducing an ignition source to the sample. Further, the refrigerant gas sensing system includes an ignition unit configured to introduce an ignition source to the sample to convert refrigerant in the sample into combustion product. Even further, the refrigerant gas sensing system includes a combustion configured to measure and provide an indication of an amount of combustion product in the sample after ignition.

In another embodiment, the present disclosure relates to a method of operating a refrigerant gas sensing system of a heating, ventilating, and air conditioning (HVAC) system. First, a processor collects and prepares a sample from a monitored gas volume associated with the HVAC system. Next, the processor introduces an ignition source to the sample and measures an amount of combustion products in the sample after the ignition source is introduced to the sample. Next, the processor determines an amount of leaked refrigerant present in the monitored gas volume based, at least in part, on the measured amount of combustion products in the sample after ignition. Then, the processor modifies operation of the HVAC system when the amount of leaked refrigerant in the monitored gas volume is above a predetermined threshold value.

Other features and advantages of the present application will be apparent from the following, more detailed description of the embodiments, taken in conjunction with the accompanying drawings, which illustrate, by way of example, the principles of the application.

DETAILED DESCRIPTION

The present disclosure is directed to a refrigerant gas sensing system that indirectly detects an amount of leaked refrigerant gas in a monitored gas volume by detecting an amount of one or more combustion products in a processed sample of the monitored gas volume. As discussed in detail below, the disclosed refrigerant gas sensing system collects an air sample from a monitored gas volume, attempts to ignite the sample under controlled conditions, and analyzes the sample after attempted ignition for the presence or concentration of combustion products of a refrigerant. In particular, in certain embodiments, the disclosed refrigerant gas sensing system can be installed in or integrated into a HVAC system to detect refrigerant that has leaked from one or more components of the HVAC system. While the example embodiments discussed below are directed to refrigerant gas sensing systems for HVAC systems, it may be appreciated that, in other embodiments, the refrigerant gas sensing system may be implemented as a stand-alone device or as a part of another system. For example, in certain embodiments, the refrigerant gas sensing system may be part of a building control system, an alarm system, a residential fire prevention system that detects leaked refrigerant, in accordance with the present disclosure.

As discussed above, a HVAC system generally includes a refrigerant flowing within a refrigeration circuit, also referred to herein as a vapor compression circuit. The refrigerant flows through multiple conduits and components while undergoing phase changes to enable the HVAC system to condition an interior space of a structure. It is to be understood that refrigerant is intended to cover all types of refrigerants that undergo a chemical reaction in the presence of oxygen and an ignition source such as flame, sparks, and/or heat. For example, the refrigerant may be or include R32, R1234ze, R1234yf, R-454A, R-454C, R-455A, R-447A, R-452B, R-454B, or another suitable refrigerant. In certain embodiments, the refrigerant may inadvertently leak from a flow path of the refrigeration circuit due to wear or degradation to components, or imperfect joints or connections within the circuit. If undetected, a concentration of the refrigerant near the refrigeration circuit may increase to a level that is greater than a predefined threshold. As such, the presently disclosed refrigerant gas sensing system can enable a controller of the HVAC system to reliably detect and manage the leak of the refrigerant before the concentration of the refrigerant reaches the predefined threshold.

As mentioned, present embodiments include a HVAC system having a refrigerant gas sensing system detects combustion products of refrigerants that have leaked from the refrigeration circuit. In particular, it is presently recognized that certain refrigerant gases, such as partially-fluorinated hydrocarbons, can produce particular combustion products that can be more easily and/or accurately detected than the refrigerant gases themselves. As such, the disclosed refrigerant gas sensing system generally includes: a sample preparation unit that collects a gas sample from a monitored gas volume and prepares the sample for ignition, an ignition unit that attempts to ignite the prepared air sample, and a combustion product detection unit that identifies combustion products in the sample after attempted ignition. In different embodiments, the combustion product detection unit may measure any suitable physical or chemical properties or effects of the combustion products, including detecting optical changes, pressure changes, chemical changes, electrical changes that occur as a result of the generation of combustion products in the sample after ignition. Accordingly, a suitable controller can control operation of the HVAC system based on signals received from the disclosed refrigerant gas sensing system. For example, when the refrigerant gas sensing system provides signals indicative of the presence or concentration of refrigerant gas in the sample, the controller may determine that a refrigerant leak has occurred in the HVAC system and provide suitable control signals to halt HVAC operation, as well as provide an alarm, such as a visual or audio alert, indicating the detected refrigerant leak. In this manner, the disclosed techniques enable detection of a leaking refrigerant within a HVAC system and enable response via any combination of suitable control actions to block or prevent the refrigerant from reaching a predetermined threshold concentration outside of the refrigeration circuit.

Figure 1:
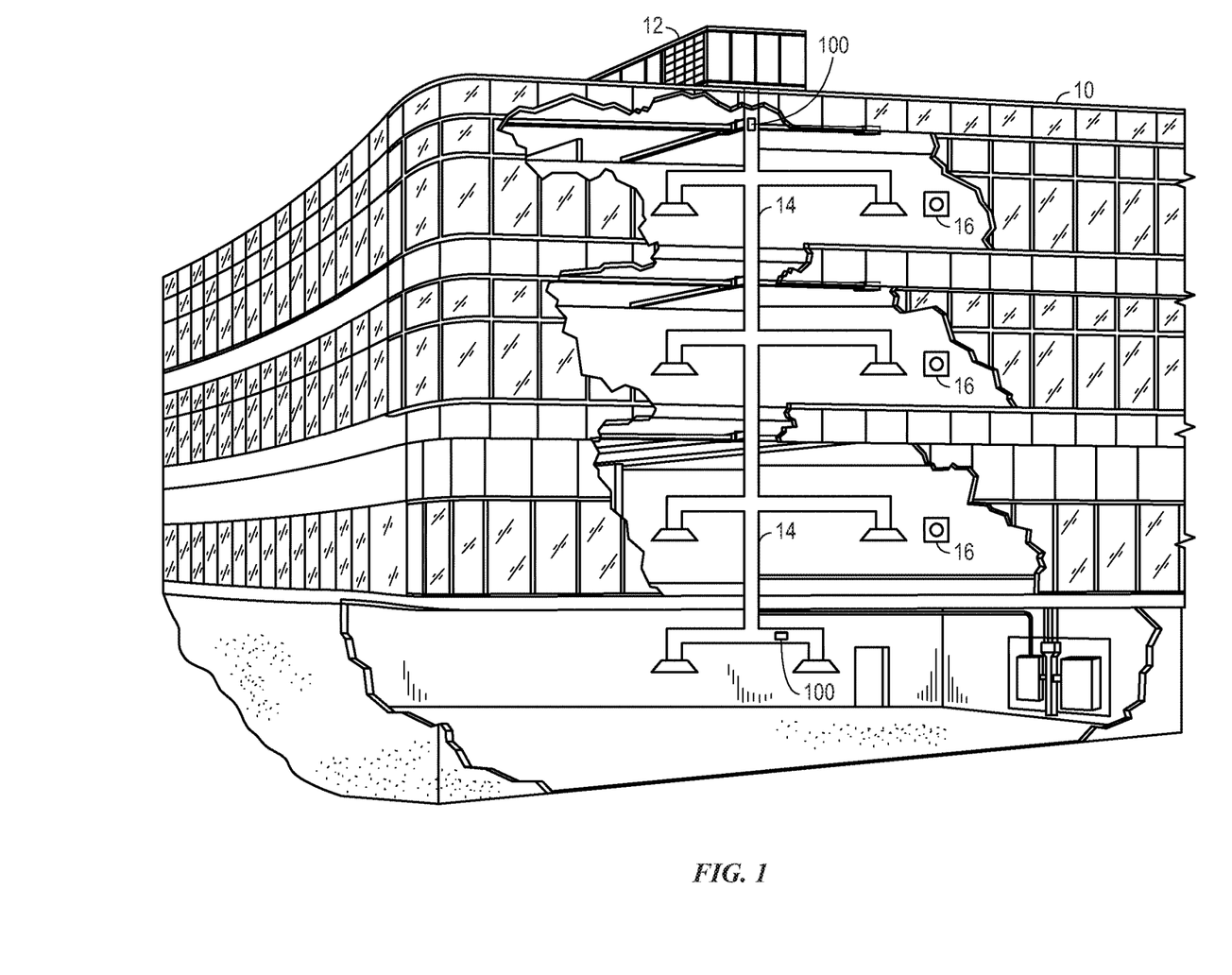
FIG. 1 is a perspective view of a commercial or industrial HVAC system, in accordance with the present technique.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
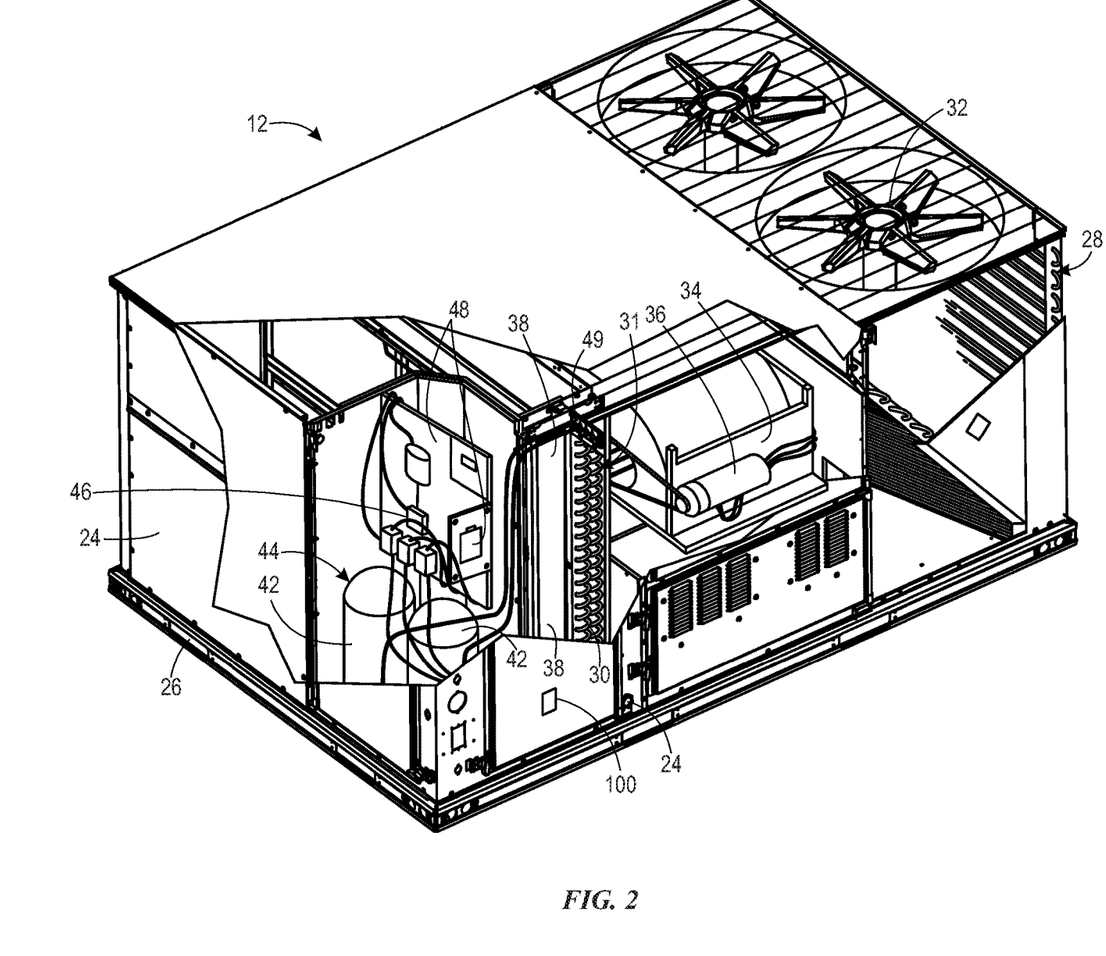
FIG. 2 is an illustration of an embodiment of a packaged unit of the HVAC system shown in FIG. 1, in accordance with the present technique.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment.

The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
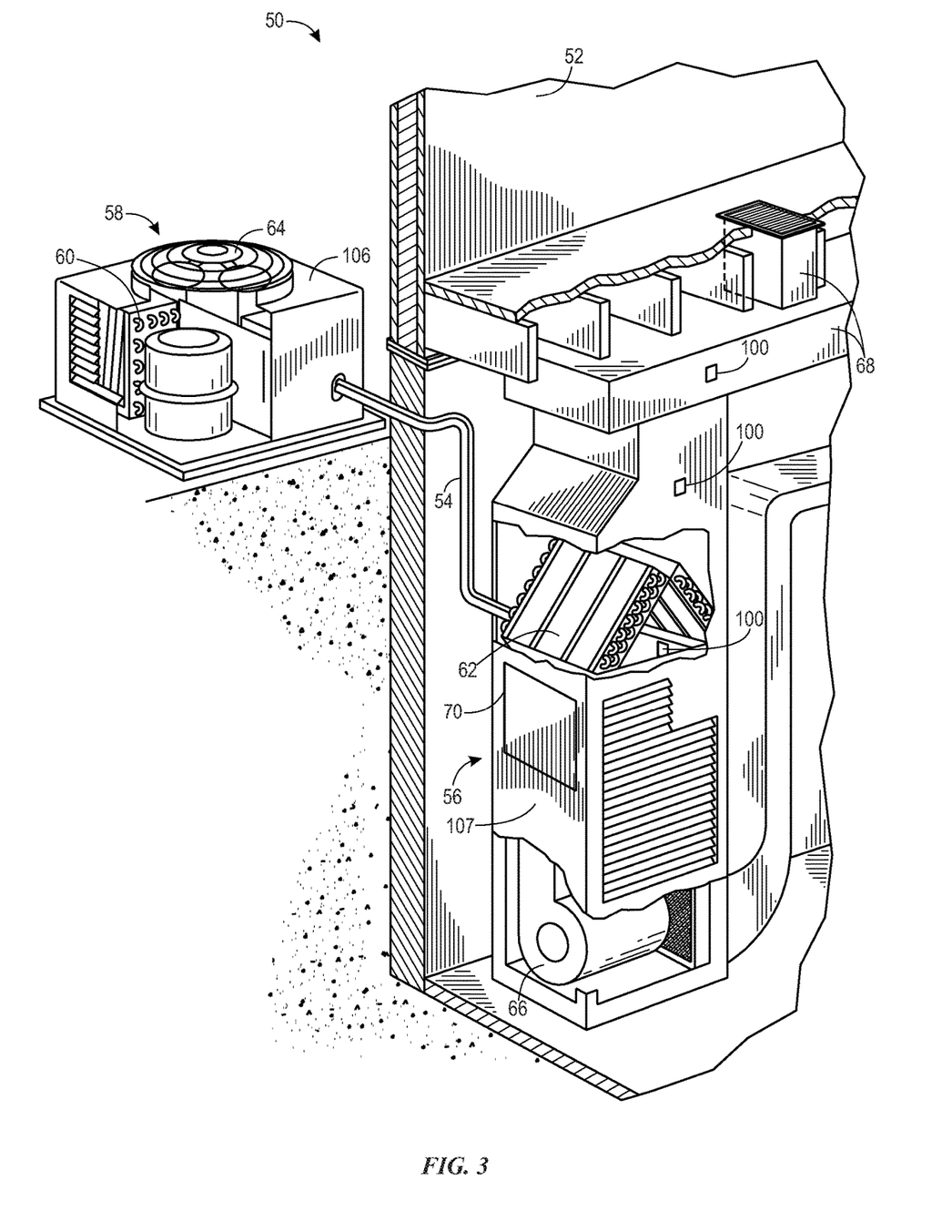
FIG. 3 is an illustration of an embodiment of a split system of the HVAC system shown in FIG. 1, in accordance with the present technique.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
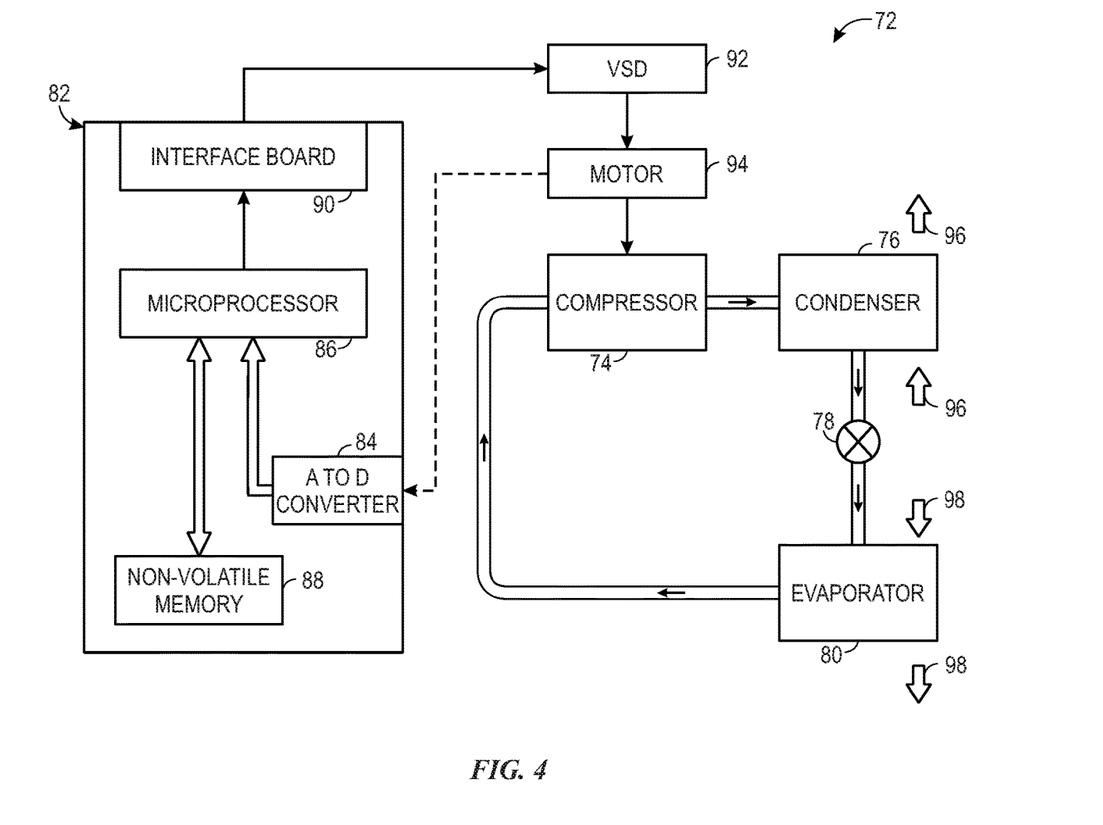
FIG. 4 is a schematic diagram of an embodiment of a refrigeration system of the HVAC system shown in FIG. 1, in accordance with an embodiment of the present technique.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
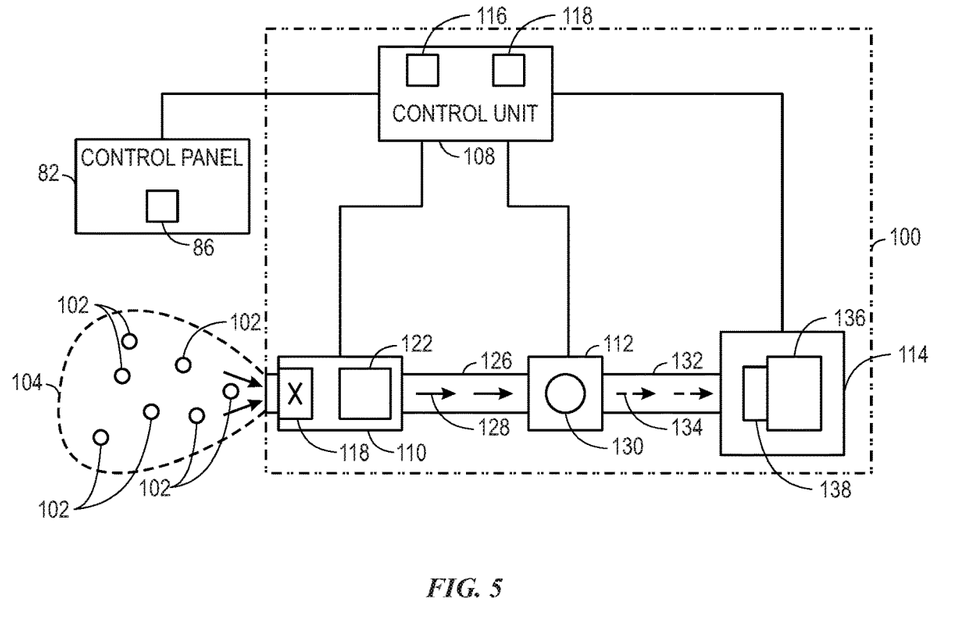
FIG. 5 is a schematic diagram of an embodiment of a refrigerant gas sensing system of the HVAC system shown in FIG. 1, in accordance with the present technique.

FIG. 5 is a diagram illustrating an embodiment of a refrigerant gas sensing system 100 that is communicatively coupled to the microprocessor 86 of the control panel 82 of the HVAC unit 12 discussed above. In certain embodiments, the refrigerant gas sensing system 100 may be integrated into the HVAC unit 12 during manufacturing, retrofitted into existing HVAC units 12 after manufacturing, and/or implemented as external sensors that are communicatively coupled to the control panel 82 via wired or wireless communication channels. For example, an external sensor may be disposed in the ductwork 14. As such, the refrigerant gas sensing system 100 is capable of providing signals to the control panel 82 that are indicative of the presence or absence of a refrigerant within a sample 102 of air.

The disclosed refrigerant gas sensing system 100 generally collects the sample 102 of air from a monitored gas volume 104 to determine whether leaked refrigerant is present within the sample 102. In certain embodiments, a refrigerant gas sensing system 100 may be disposed within the cabinet 24 of the HVAC unit 12, or within the casing 106 of the outdoor HVAC unit 58, or within the casing 107 of the indoor HVAC unit 56, and the monitored gas volume 104 corresponds to an interior air volume within the packaging of these respective units, as indicated FIGS. 2 and 3. In particular, as illustrated in FIG. 3, in certain embodiments, the refrigerant gas sensing system 100 may be disposed near the indoor heat exchanger 62. For example, the refrigerant gas sensing system 100 may be within a few inches of, adjacent to, or directly below an evaporator. In other embodiments, a refrigerant gas sensing system 100 may be disposed within the ductwork 14 of the building 10, as illustrated in FIG. 1, and the monitored gas volume 104 corresponds to an interior air volume within the ductwork 14.

The illustrated embodiment of the refrigerant gas sensing system 100 includes a control unit 108, a sample preparation unit 110, an ignition unit 112, and a combustion product detection unit 114 that cooperate to enable the refrigerant gas sensing system 100 to function as disclosed. In general, the sample preparation unit 110 collects the sample 102 from the monitored gas volume 104 and prepares the sample for ignition, the ignition unit 112 attempts to ignite the prepared air sample, the combustion product detection unit 114 identifies combustion products in the sample after attempted ignition, and the control unit 108 controls operation of the other units. In other embodiments, the refrigerant gas sensing system 100 may lack the control unit 108 and the microprocessor 86 of the control panel 82 may control operation of the various units of the refrigerant gas sensing system 100, as set forth herein.

The control unit 108 of the illustrated embodiment of the refrigerant gas sensing system 100 includes a processor 116 and memory 118. The memory 118 stores computer-readable instructions that are executed by the processor 116 to control operation of the refrigerant gas sensing system 100. For example, based on these instructions, the processor 116 can provide suitable control signals to activate, deactivate, and/or modify operation of the various components of the refrigerant gas sensing system 100 to enable the sensor to detect a refrigerant in the sample 102. Additionally, the processor 116 can determine a presence or concentration of refrigerant in the sample 102 based on signals received from the combustion product detection unit 114, as discussed below.

The sample preparation unit 110 of the refrigerant gas sensing system 100 includes suitable elements to prepare the sample 102 for ignition. For example, the illustrated sample preparation unit 110 includes a valve 118 that is communicatively coupled to the processor 116 of the control unit 108. As such, the control unit 108 can provide suitable control signals 120 to monitor and adjust the position of the valve 118 to control an amount or rate that the sample 102 is collected from the monitored gas volume 104. In other embodiments, the sample preparation unit 110 may include dampers, adjustable louvers, or other suitable flow control mechanism, in accordance with the present disclosure. In certain embodiments, the sample preparation unit 110 may include one or more filters to remove particulates, moisture, or other components from the sample 102 that might interfere with later analysis for combustion products. In certain embodiments, the sample preparation unit 110 may include a heater or another suitable mechanism to warm the sample 102. Additionally, since it is presently recognized that the combustibility of a gas samples can increase with pressure, in certain embodiments, the sample preparation unit 110 includes a compressor 122 that increases a pressure of the sample 102. Additionally, it is presently recognized that compressing the sample 102 prior to ignition and detection may aid in the detection of low concentrations of the refrigerant gas.

In the illustrated embodiment, the ignition unit 112 is fluidly coupled to the sample preparation unit 110 by a first gas flow line 126 and receives a first gas flow 128 from the sample preparation unit 110, which is the sample 102 after being prepared to attempt ignition by introducing an ignition source to the first gas flow 128. The ignition unit 112 is communicatively coupled to the processor 116 of the control unit 108 and receives control signals indicating when to activate an ignition source 130 of the ignition unit 112. For example, the ignition source 130 may be an electrical ignition source that produces an exposed electrical arc in response to an applied electrical voltage, such that the exposed arc can potentially ignite the first gas flow 128 as it traverses the ignition unit 112. For example, the ignition source may be a spark plug. Further, ignition of the first gas flow 128 may result in combustion or partial combustion of the first gas flow 128. In certain embodiments, the ignition source 140 is periodically activated by the processor 116 at the same time as the first gas flow 128 is periodically provided to the ignition source 130. In certain embodiments, the ignition unit 112 may include a number of ignition sources 130 that are activated simultaneously or in series.

Additionally, for the illustrated embodiment, the combustion product detection unit 114 is fluidly coupled to the ignition unit 112 by a second gas flow line 132 and receives a second gas flow 134 from the ignition unit 112. For example, the second gas flow 134 may receive sample 102 after preparation and ignition. The combustion product detection unit 114 includes at least one combustion product detector 136 that interacts with the second gas flow 134 and measures at least one property of the second gas flow 134. As such, the combustion product detector 136 is communicatively coupled to the processor 116 of the control unit 108 to provide suitable signals that are indicative of a presence or concentration of a combustion product in the second gas flow 134. For example, as discussed below, in certain embodiments, the combustion product detector 136 may directly measure a change in a property in the second gas flow 134, such as a change in an optical property or an electrical property the second gas flow 134 that is indicative of the presence or concentration of a combustion product. For example, changes in an optical property may include a change in an absorption or emission spectrum. In certain embodiments, the combustion product detector 136 may indirectly measure a concentration or presence of a combustion product in the second gas flow 134 by measuring a change in an optical property or an electrical property of a portion of a sensing element 138, such as the substrate 142 of FIG. 6, that is modified by exposure to particular combustion products. In certain embodiments, the combustion product detector 136 may be or may include a camera component that captures light that may be produced as a result of ignition and combustion of a refrigerant gas. The light may be ultra-violet (UV) light, visible light, or infrared (IR) light. Additionally, the combustion product detection unit 114 is fluidly coupled to the external environment and releases the second gas flow 134 from the refrigerant gas sensing system 100 after traversing the combustion product detection unit 114.

Based on signals received from the combustion product detector 136 of the combustion product detector unit 114, the processor 116 of the control unit 108 may send a signal to the microprocessor 86 of the control panel 82 to modify operation of the HVAC unit 12, such as shutting down or preventing reactivation of the HVAC unit 12, or sending a signal to a user such as an audible or visual alert. It is also presently recognized that it can be advantageous to control the operation of the refrigerant gas sensing system 100 based on the state of the HVAC unit 12, in certain embodiments. For example, the HVAC can detect refrigerant gases prior to reactivation of the HVAC system to mitigate any potential risks. In certain embodiments, the control panel 82 may send signals to the control unit 108 to control operation of the refrigerant gas sensing system 100. For example, the microprocessor 86 of the control panel 82 might send signals to the processor 116 of the control unit 108 of the indicating whether the HVAC system is in an idle state. An idle state might be when the compression circuit is not running. As such, in certain embodiments, the control panel 82 and control unit 108 may activate the refrigerant gas sensing system 100 based on the state of the HVAC system. Then, upon operation of the refrigerant gas sensing system 100, as described above, the combustion product detector 136 will send data indicative of the presence of refrigerant gas in the sample 102. Based on the data received by the control unit 104 from the combustion product detector 136, the control unit 104 makes a determination whether to send a signal to the control panel 82 or a signal to a user, as described above.

Figure 6:
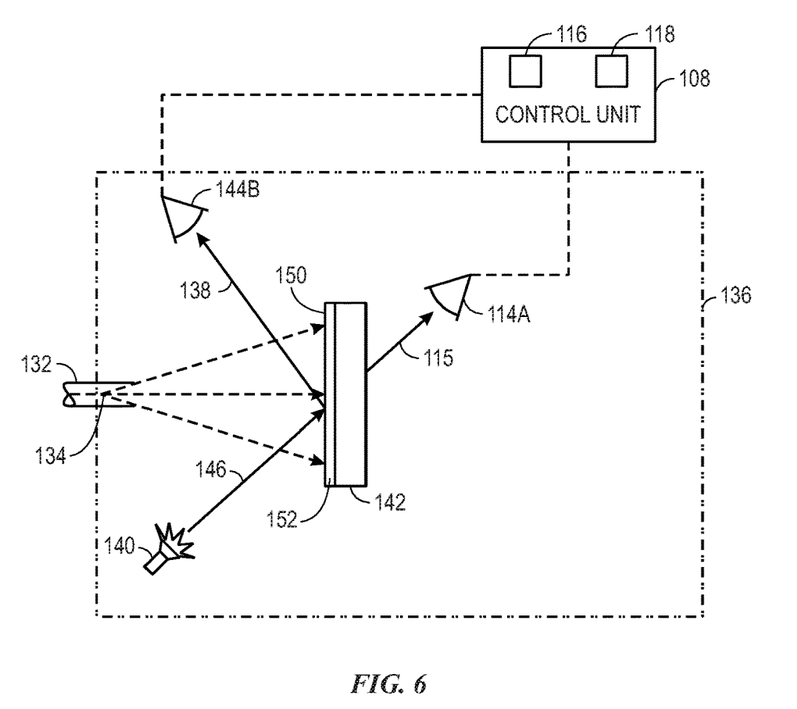
FIG. 6 is a schematic diagram of an embodiment of a combustion product detection unit of the refrigerant gas sensing system shown in FIG. 5, in accordance with the present technique.

FIG. 6 is a schematic diagram illustrating an embodiment of the combustion product detector 136 of a combustion product detection unit 136 of the refrigerant gas sensing system 100. More specifically, the combustion product detector 136 illustrated in FIG. 6 optically detects or measures a presence or concentration of combustion products in the second gas flow 134. The illustrated embodiment includes a light source 140, a substrate 142, and one or more light detectors 126a and 126b. In certain embodiments, the substrate 142 may be a least partially transparent to the incident light 146, while in other embodiments, the substrate 142 may be substantially opaque and reflective. As illustrated, the light detector 144a is disposed on the opposite side of the substrate 142, while light detector 144b is disposed on the same side, relative to the light detector. As such, the light source 140 generates an incident light 146 that results in a reflection path 148, and/or a transmission/refraction path 150 that are each detected by a respective light detector 144b or 144a. In certain embodiments, the incident light 146 from the light source 140 may be polarized. Further, the resulting polarization of the light of the reflection path 148 and/or the transmission/refraction path 150 is different than the polarization of the incident light 146. In these embodiments, the detector 144 might detect change in the polarization of light that is indicative of the presence or concentration of combustion products in the second gas flow 134. Other embodiments of the combustion product detector 136 may include only one of the light detectors 144a and 144b.

During operation of the embodiment of the combustion product detector 136 illustrated in FIG. 5, the second gas flow 134 received from the ignition unit 112 may react with the substrate 142, resulting in a change of the optical path of incident light 146. For example, when the second gas flow 134 includes a combustion product that reacts with or deposits onto the surface 152 of the substrate 142, modifying the optical properties of the substrate 142, such as the reflectance, scattering, absorption, or refraction of light. The one or more light detectors 144a or 144b are disposed in suitable positions about the substrate 142 to detect a change in the properties of the incident light 146 upon the substrate 142 being exposed to particular combustion products in the second gas flow 134.

The substrate 142 of the combustion product detector 136 illustrated in FIG. 6 may be made of any number of suitable materials, including but not limited to metals, metal oxides, and polymers that interact with contact with particular combustion products present in the second gas flow 134. For example, refrigeration gases might include hydrofluorocarbons (HFC), chlorofluorocarbons (CFC), hydrofluoroolefins (HFO), or hydrochlorofluorocarbons (HCFC). It is presently recognized that ignition of one of these gases can produce a number of different chemical species, including certain reactive combustion products, such as hydrogen fluoride (HF), hydrogen chloride (HCl), as well as corresponding acids of these gases of in the presence of moisture. It is presently recognized that such reactive species can interact with the surface 152 of the substrate 142 and alter the optical properties of the substrate 142. For example, for the embodiment illustrated in FIG. 6, the substrate 142, such as a silicon or metal substrate, includes an oxide layer 154, such as a silicon dioxide layer ($SiO_2$) or a metal oxide layer. As such, exposing the oxide layer 154 to HF and/or hydrofluoric acid results in partial or complete corrosion of the oxide layer 154. This results in a change in the optical properties, either by inducing more scattering of the light incident on the surface 152 of the substrate 142, or inducing a chemical change that may affect other properties of the substrate 142, such as refraction or absorption.

Figure 7:
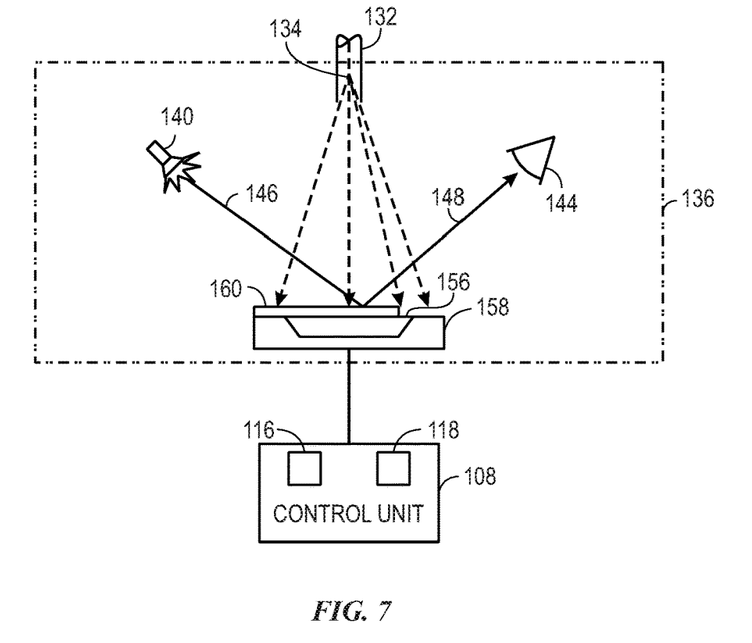
FIG. 7 is a schematic diagram of another embodiment of a combustion product detection unit of the refrigerant gas sensing system shown in FIG. 5, in accordance with the present technique.

FIG. 7 illustrates an embodiment of a cantilever-based combustion product detector 136 of a combustion product detection unit 114, in accordance with the present technique. Like the combustion product detector 136 illustrated in FIG. 6, the cantilever-based combustion product detector 136 illustrated in FIG. 7 includes a light source 140 and a light detector 144. The embodiment of the combustion product detector 136 illustrated in FIG. 7 also includes a cantilever 156 disposed on a substrate 158, wherein a surface 160 of the cantilever 156 may be substantially reflective. Further, any suitable combination of the substrate 158, cantilever 156, and/or light detector 144 are communicatively coupled to the processor 116 of the control unit 108 to enable the combustion product detector 136 to operate as described herein.

During operation of the embodiment of the cantilever-based combustion product detector 136 illustrated in FIG. 7, incident light 146 from the light source 140 impinges on the cantilever 156 and reflects along a reflection path 148. The cantilever 156 and substrate 158 are disposed in a suitable position downstream of second gas flow 134 and interact with combustion products present within the second gas flow 134. One or both of the cantilever 134 or substrate 158 may interact with combustion products in the second gas flow 134. As a result of this interaction, the cantilever 134 and/or the substrate 158 may be modified by interacting with these combustion products. For example, the substrate 158 may be deformed, swollen, corroded, or chemically altered.

For the embodiment of the cantilever-based combustion product detector 136 illustrated in FIG. 7, this substrate modification may be detected in one or more manners. For example, the processor 116 of the control unit 108 may optically detect the modification, electrically detect the modification, or use some combination thereof. For example, the modification may result in a change in the reflection path 148 that results in a change in the intensity of light detected by the detector 144. In certain embodiments, the detector 144 may detect a change in polarization of the incident light 146 based on the polarization of the light of the reflection path 148. At the time of manufacturing or just prior to receiving the second gas flow 134, the light detector 144 might undergo calibration to determine an initial of light reaching the light detector 144 prior to modification of the cantilever 156 and/or substrate 158. As such, a signal indicating an intensity of light received by the light detector 144 is sent to the control unit 108 and used by the processor 116 to determine the presence or concentration of refrigerant gases in the second gas flow 134. Additionally or alternatively, in certain embodiments, the cantilever 156 can be a piezoelectric material. For example, the cantilever 156 may be a quartz crystal microbalance. For such embodiments, the piezoelectric material may function to generate suitable electrical signals or changes in electrical signals detectable by the control unit 108 in response to the modification at the cantilever 156 and/or substrate 158 by combustion products in the second gas flow 134. In certain embodiments, the cantilever-based combustion product detector 136 may include both the optical and electrical detection methods, and the control unit 108 may determine that combustion products are present in the second gas flow 134 based on a consensus of signals received from the light detector 144 and the cantilever 156 and/or substrate 158. In other embodiments, the cantilever-based combustion product detector 136 may not include the optical detection components and may only detect the modification of the cantilever 156 and/or substrate 158 based on changes in the electrical signals received from the cantilever 156 and/or substrate 158.

Figure 8:
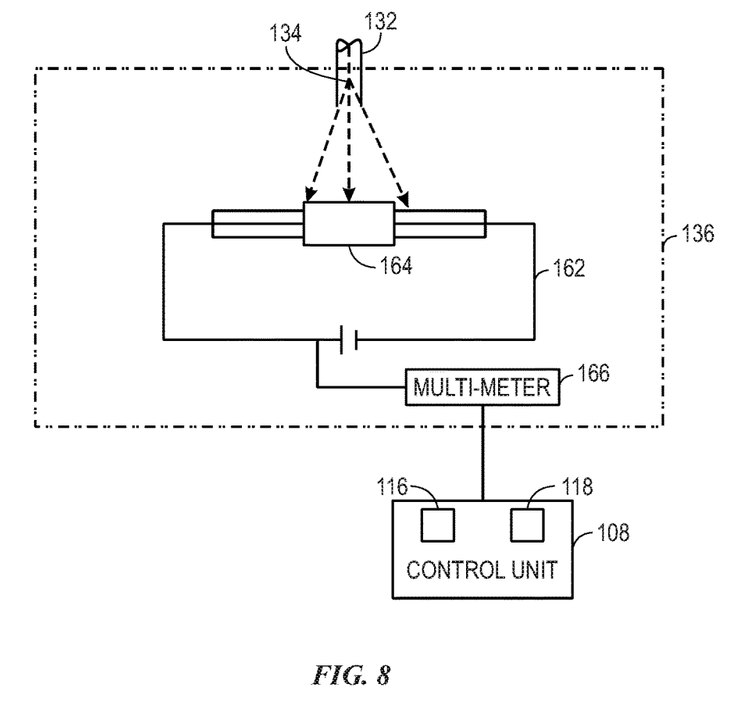
FIG. 8 is a schematic diagram of another embodiment of a combustion product detection unit of a refrigerant gas sensing system shown in FIG. 5, in accordance with the present technique.

FIG. 8 illustrates another embodiment of a combustion product detector 136 of the combustion product detection unit 114 of the refrigerant gas sensing system 100, in accordance with the present technique. The embodiment of the combustion product detector 136 illustrated in FIG. 8 includes a circuit 162 that is at least partially exposed to the second gas flow 134. Additionally, the circuit 162 of the illustrated embodiment includes a combustion product sensitive material 164. The combustion product sensitive material 164 is disposed within the circuit 162, such that the presence of combustion product sensitive material 164 completes the circuit 162. The combustion product sensitive material 164 may be any suitable conductive material having electrical properties that are modified by exposure to certain combustion products in the second gas flow 134.

During operation of the embodiment of the combustion product detector 136 illustrated in FIG. 8, electrical measurements of the circuit 162 are generally performed. The second gas flow 134 received from the ignition unit 112 is directed towards and impinges on the combustion product sensitive material 164. As mentioned, the second gas flow 134 may constitute reactive combustion products. When the combustion product sensitive material 164 interacts with combustion products in the second gas flow 134, the combustion product sensitive material 164 is sufficiently modified to change the electrical of the combustion product sensitive material 164 and the circuit 162. In certain embodiments, the circuit 162 includes a multi-meter 166 communicatively coupled to the processor 116 of the control unit 108. The multi-meter 166 provide suitable signals to indicate changes in one or more electrical properties of the combustion product sensitive material 164 and the circuit 162. Based on the change in the electrical properties of the circuit 162, the processor 116 of the control unit 108 may determine the presence or concentration of a refrigerant gas in the sample 102 collected from the monitored gas volume 104.

Figure 9:
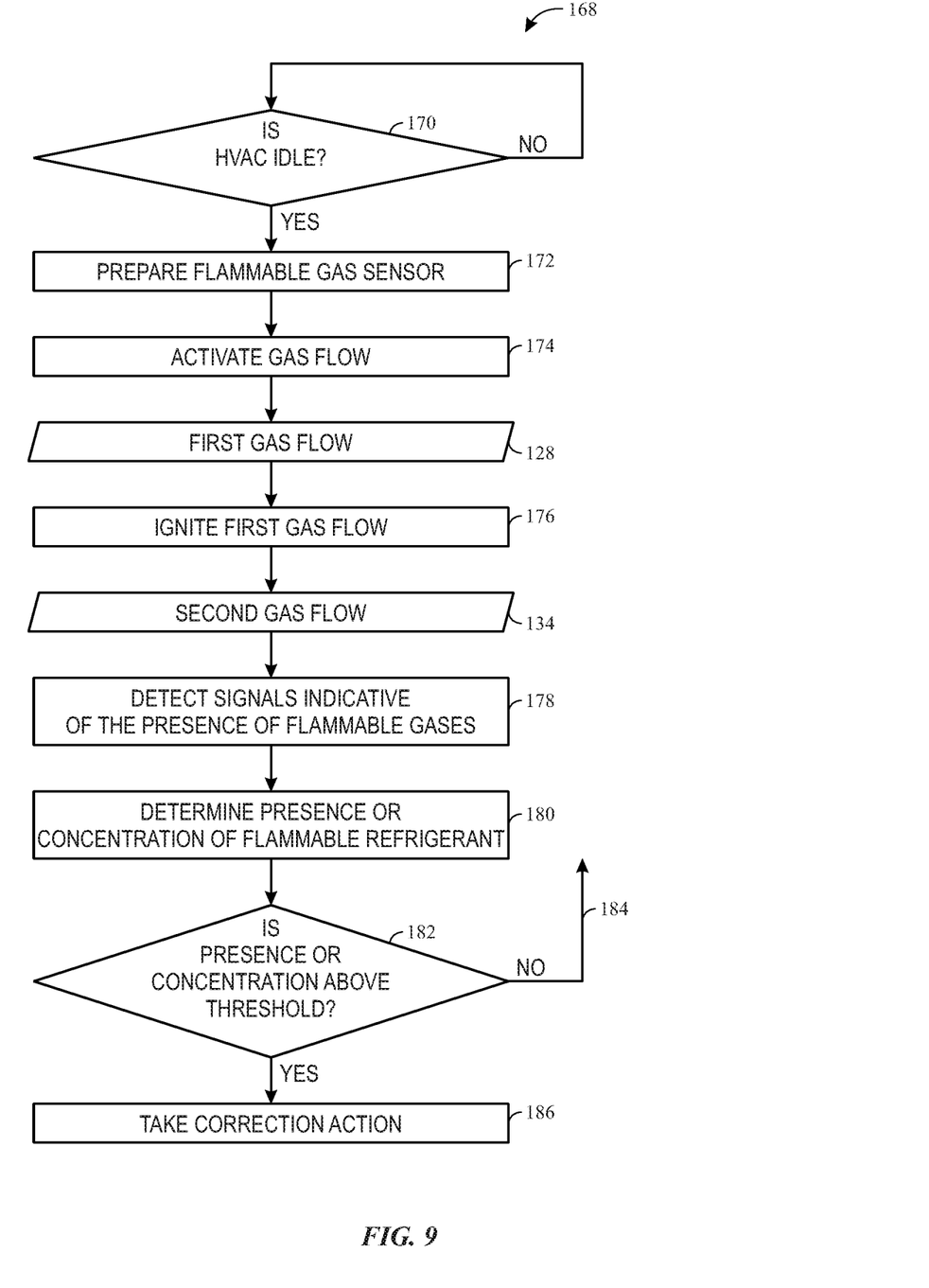
FIG. 9 is a flow diagram representing an embodiment of a process of operating the refrigerant gas sensing system shown in FIG. 5, in accordance with the present technique.

FIG. 9 is a flow diagram illustrating an embodiment of a process 168 for operating the refrigerant gas sensing system 100, in accordance with present techniques. It is to be understood that the steps discussed herein are merely exemplary, and certain steps may be omitted or performed in a different order than the order discussed herein. In some embodiments, the process 168 may be stored in the memory 118 and executed by the processor 116 of the control unit 108, or stored in the non-volatile memory 88 and executed by the microprocessor 86 of the control unit 82, or stored in other suitable memory and executed by other suitable processing circuitry associated with the HVAC system.

The illustrated embodiment of the process 168 begins with the processor 116 determining whether the HVAC system is idle, as indicated in block 170. In certain embodiments the processor may determine whether the HVAC system is in an off-state, whether motor 94 of the compressor 74 and fans associated with condenser 76 and evaporator 80 are deactivated. That is, it is presently recognized that, in certain embodiments, it is advantageous to operate the refrigerant gas sensing system 100 when the HVAC system is idle, in particular if the refrigerant gas sensing system 100 is disposed within the casing 106 of the indoor HVAC unit 56, such as near the evaporator 80 illustrated in FIG. 3. That is, it is presently recognized that leaked refrigerant should accumulate in this region in the absence of the air flow that is present when the HVAC system is operating. For example, operating may include when the HVAC system is in an on state or when motor 94 of the compressor 74 and fans associated with condenser 76 and evaporator 80 are activated. Additionally, it is presently recognized that by checking for a refrigerant leak between on-cycles of the HVAC system, the processor 116 can subsequently prevent reactivation of the HVAC system. In certain embodiments, the processor 116 of the control unit 108 of the refrigerant gas sensing system 100 may receive a suitable signal from the microprocessor 86 of the control panel 82 to determine when the HVAC system is idle. For embodiments in which the microprocessor 86 of the control panel 82 executes the process 168, the microprocessor 86 may provide control signals to deactivate the HVAC system before proceeding to the next step of the illustrated process 168. For example, control panel 82 may place the HVAC system is in an off-state by deactivating the motor 94 of the compressor 74 and fans associated with condenser 76 and evaporator 80.

Once the HVAC system is determined to be idle, the processor 116 provides suitable control signals to prepare the refrigerant gas sensing system 100 for measurement, as indicated in block 172. In certain embodiments, preparing the refrigerant gas sensing system 100 can involve calibrating the one or more combustion product detectors 136 of the combustion product detection unit 114. For example, this may involve recording baseline measurements of the intensity, resistance, or capacitance from the combustion product detector 136 before the sample 102 is collected, which are later used for comparison to measurements obtained after the sample 102 reaches the combustion product detector 136. In particular, depending on the components of the combustion product detector 136, calibrating can involve measuring an initial light intensity from a light source 140 by a light detector 144. In certain embodiments, calibrating can involve measuring electrical properties of components the combustion product detector 136, such as the cantilever 134 and/or substrate 136, as illustrated in FIG. 7. For embodiments in which the combustion product detector 136 is or includes a camera, calibrating can involve collecting baseline image data of the ignition source 130 prior to sample collection.

After the refrigerant gas sensing system is prepared, the processor 116 of the control unit 108 provides suitable control signals to the sample preparation unit 110 to collect the sample 102 from the monitored gas volume 104, as indicated in block 174. For example, for the embodiment of the refrigerant gas sensing system 100 illustrated in FIG. 5, this involves the processor 116 providing suitable control signals to modify the valve 110 to an open position and activate the compressor 122, or another suitable air moving mechanism, to draw in the sample and generate the first gas flow 128. As set forth above, for embodiments that include the compressor 122, the first gas flow 128 may be compressed within the first gas line 112 before reaching the ignition unit 112.

In response to suitable control signals received from the processor 116, within the ignition unit 112, the ignition source 130 ignites the received first gas flow 128, as indicated in block 176. The ignited sample exits the ignition unit as the second gas flow 134, which may include combustion products of a refrigerant. As mentioned above, the ignition source 130 or an array of ignition sources 130 may be activated by the processor 116 in a suitable manner to ignite refrigerant present within the first gas flow 114. For example, the ignition sources may be activated in series, repeatedly, or periodically. Additionally, in certain embodiments, the processor 116 may provide suitable control signals to allow the second gas flow 134 to traverse the second gas flow line 132 and reach the combustion product detection unit 114, as illustrated in FIG. 5.

Continuing through the embodiment of the process 168 illustrated in FIG. 9, the processor 116 of the control unit 108 then receives signals indicative of the detection of combustion products from the combustion product detector 136 of the combustion product detection unit 114, as indicated in block 178. As discussed above with respect to FIGS. 6-8, the signals provided by the combustion product detector 136 may be derived from optical and/or electrical measurements of components of the combustion product detector 136 that interact with, and are modified by, combustion products that may be present in the second gas flow 134.

Continuing through the embodiment of the process 168 illustrated in FIG. 9, the processor 116 of the control unit 108 then determines a presence or an amount or concentration of refrigerant within the sample 102 based at least in part on the signals received from the combustion product detector 136, as indicated in block 180. For example, in certain embodiments, the control unit 108 may store in the memory 118 look-up tables that relate measurement signals received from the combustion product detector 136 with known concentrations of refrigerant based on design experimentation. In other embodiments, any significant change in a measurement may provide a binary indication of the presence of the refrigerant in the sample 102 and the monitored gas volume 104.

Subsequently, the processor 116 of the control unit 108 may determine whether the determined presence, or amount of refrigerant is sufficient to initiate corrective action or if it is low enough to be ignored, as indicated in block 182. For example, in certain embodiments, the control unit 108 may store in the memory 118 a threshold value associated with a refrigerant concentration. As such, in block 182, the processor 116 may compare the current determined concentration of the refrigerant to the stored threshold value. As illustrated, when the processor 116 determines that the amount of the refrigerant is not sufficiently high in block 182, then the processor 116 returns back to the beginning of the process 168, as indicated by the arrow 184.

When the processor 116 determines that the amount of refrigerant is sufficiently high for corrective action, then the processor 116 may provide suitable signals to cause the HVAC system to take corrective action, as indicated in block 186. For example, in certain embodiments, the processor 116 provides signals to the microprocessor 86 of the control panel 82 to modify operation of the HVAC system, such as blocking or preventing all or portions of the HVAC system from returning to an active state. In certain embodiments, any amount of detected refrigerant is considered sufficiently high to trigger the processor 116 to take corrective action. Additionally, in certain embodiments, the corrective action of block 186 may include the processor 116 providing suitable signals to generate an alarm or an alert on a device associated with the HVAC system or a device of an occupant of the building, to inform people of the detected refrigerant leak. Further, in certain embodiments, the corrective action of block 162 may include the microprocessor 86 providing suitable signals to activate fans associated with the ductwork of the HVAC system to disperse the leaked refrigerant within or outside of the building 10. For example, fans associated with the ductwork 14 and/or 68 may disperse the leaked refrigerant into a larger volume to dilute to the leaked refrigerant to a reduced concentration. For embodiments in which an exhaust ventilation feature is present in the HVAC system and/or the building 10, fans associated with this exhaust feature may direct and disperse the leaked refrigerant outside of the building 10.

Accordingly, the present disclosure is directed to a refrigerant gas sensing system capable of detecting and mitigating leaks of a refrigerant. The refrigerant gas sensing system generally samples air from a monitored gas volume, and then attempts to detect combustion products in the sample after ignition. The refrigerant gas sensing system is designed to measure suitable physical or chemical properties or effects of combustion products, such as optical changes, pressure changes, chemical changes, electrical changes that occur as a result of interactions between combustion products and components of the combustion product detection unit of the refrigerant gas sensing system. Accordingly, operation of the HVAC system can be controlled based at least in part on signals received from the disclosed refrigerant gas sensing system. For example, in response to determining that the concentration of refrigerant is sufficiently high, the processor 116 may provide control signals to take corrective action, such as transmitting an alert indicative of the concentration of the refrigerant, stopping operation of the HVAC system. In this manner, the disclosed refrigerant gas sensing system may improve operation of the HVAC system while enabling the detection and mitigation of refrigerant leaks substantially before the refrigerant may reach the predetermined threshold concentration.

While only certain features and embodiments of the present disclosure have been illustrated and described, many modifications and changes may occur to those skilled in the art. For example, modifications may include variations in sizes, dimensions, structures, shapes and proportions of the various elements, values of parameters, mounting arrangements, use of materials, and orientations, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described. For example, those unrelated to the presently contemplated best mode of carrying out of the disclosure, or those unrelated to enabling the claim features may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:
1. A refrigerant gas sensing system of a heating, ventilating, and air conditioning (HVAC) system, comprising:
a controller communicatively coupled to a sample preparation unit, an ignition unit, a combustion product detection unit, and a control panel of the HVAC system, wherein the controller is configured to:
provide a first control signal to the sample preparation unit to collect a sample from a monitored gas volume that is separate from a refrigerant circuit of the HVAC system;

provide a second control signal to the sample preparation unit to increase a pressure of the sample to generate a pressurized sample;

provide a third control signal to the ignition unit to introduce an ignition source to the pressurized sample;

receive a fourth signal from the combustion product detection unit indicative of an amount of combustion product in the pressurized sample after the ignition source is introduced to the pressurized sample;

determine an amount of leaked refrigerant in the monitored gas volume based on the measured amount of combustion product; and output a fifth signal to the control panel of the HVAC indicative of the amount of leaked refrigerant in the monitored gas volume.

2. The refrigerant gas sensing system of claim 1, comprising the sample preparation unit that is configured to collect the sample from the monitored gas volume and to prepare the sample for introducing the ignition source to the sample.

3. The refrigerant gas sensing system of claim 2, wherein the sample preparation unit comprises a compressor configured to increase the pressure of the sample to prepare the sample for introducing the ignition source to the pressurized sample.

4. The refrigerant gas sensing system of claim 1, comprising the ignition unit configured to introduce the ignition source to the pressurized sample to generate the combustion product.

5. The refrigerant gas sensing system of claim 4, wherein the ignition source is a spark plug.

6. The refrigerant gas sensing system of claim 1, wherein introducing the ignition source to the pressurized sample comprises flowing the pressurized sample through the ignition source.

7. The refrigerant gas sensing system of claim 1, comprising the combustion product detection unit configured to detect a change in an electrical property of a material to detect the amount of combustion product in the pressurized sample after the ignition source is introduced to the pressurized sample.

8. The refrigerant gas sensing system of claim 1, comprising the combustion product detection unit having a light source, a surface, and a light detector, wherein the combustion product detection unit is configured to detect a change in an optical property of the surface to detect the amount of combustion product in the pressurized sample after the ignition source is introduced to the pressurized sample.

9. The refrigerant gas sensing system of claim 1, comprising the combustion product detection unit having a light detector configured to detect light emitted from the ignition source during sample ignition to detect the amount of combustion product in the pressurized sample after the ignition source is introduced to the pressurized sample.

10. The refrigerant gas sensing system of claim 1, comprising the combustion product detection unit having a piezoelectric material that detects the amount of combustion product in the pressurized sample after the ignition source is introduced to the pressurized sample based on a modified electrical property of the piezoelectric material.

11. The refrigerant gas sensing system of claim 1, wherein the refrigerant gas sensing system comprises a pressure sensor, wherein the pressure sensor is configured to measure the pressure of the pressurized sample after providing the third control signal to the ignition unit to introduce the ignition source to the pressurized sample.

12. The refrigerant gas sensing system of claim 1, wherein the monitored gas volume is within an interior volume of a casing of a HVAC unit of the HVAC system.

13. The refrigerant gas sensing system of claim 1, wherein the refrigerant gas sensing system is disposed near an evaporation coil of the HVAC system.

14. The refrigerant gas sensing system of claim 1, wherein the combustion product comprises hydrogen fluoride and hydrogen chloride.

15. A heating, ventilating, and air conditioning (HVAC) system, comprising:

a first compressor configured to compress a flow of refrigerant in a refrigerant circuit of the HVAC system; and a refrigerant gas sensing system, wherein the refrigerant gas sensing system comprises:

a sample preparation unit configured to collect a sample of gas from a monitored gas volume that is distinct from the refrigerant circuit and prepare the sample for introducing an ignition source to the sample, wherein the sample preparation unit comprises a second compressor configured to compress the sample to generate a pressurized sample;

an ignition unit fluidly coupled to the sample preparation unit and configured to introduce the ignition source to the pressurized sample to convert refrigerant in the pressurized sample into combustion product; and a combustion product detection unit fluidly coupled to the ignition unit and configured to measure and provide an indication of an amount of combustion product in the pressurized sample after the ignition source is introduced to the pressurized sample; and a control unit communicatively coupled to the combustion product detection unit, wherein the control unit is configured to receive the indication of the amount of combustion product in the pressurized sample after the ignition source is introduced to the pressurized sample, and determine and amount of leaked refrigerant in the monitored gas volume based on the indication.

16. The system of claim 15, wherein the refrigerant gas sensing system comprises a control unit communicatively coupled to the sample preparation unit, the ignition unit, and the combustion product detection unit of the refrigerant gas sensing system, wherein the control unit is configured to receive the indication of the amount of combustion product in the pressurized sample after the ignition source is introduced to the pressurized sample, and determine an amount of leaked refrigerant in the monitored gas volume based on the indication.

17. The system of claim 16, comprising a HVAC controller communicatively coupled to the control unit of the refrigerant gas sensing system, wherein the HVAC controller is configured to control operation of the HVAC system based, at least in part, on the determined amount of leaked refrigerant.

18. The system of claim 15, wherein the combustion product detection unit comprises a light detector configured to optically detect the amount of combustion product in the pressurized sample after the ignition source is introduced to the pressurized sample.

19. The system of claim 18, wherein the light detector is configured to detect a change in an optical property of a surface to optically detect the amount of combustion product in the pressurized sample after the ignition source is introduced to the pressurized sample.

20. The system of claim 18, wherein the light detector is configured to detect a change in a property of light traversing the pressurized sample to optically detect the amount of combustion product in the pressurized sample after the ignition source is introduced to the pressurized sample.

21. The system of claim 15, wherein the combustion product detection unit comprises a pressure sensor configured to detect a change in a pressure of the pressurized sample to detect the amount of combustion product in the pressurized sample after the ignition source is introduced to the pressurized sample.

22. A controller-implemented method of operating a refrigerant gas sensing system of a heating, ventilating, and air conditioning (HVAC) system, comprising:
- collecting and preparing, via a controller, a sample from a monitored gas volume that is separate from a refrigerant circuit associated with the HVAC system, wherein collecting and preparing the sample comprises increasing a pressure of the sample from the monitored gas volume to generate a pressurized sample;
- introducing, via the controller, an ignition source to the pressurized sample and measuring an amount of combustion products in the pressurized sample after ignition;
- determining, via the controller, an amount of leaked refrigerant present in the monitored gas volume based, at least in part, on the measured amount of combustion products in the pressurized sample after ignition; and
- modifying, via the controller, operation of the HVAC system when the amount of leaked refrigerant in the monitored gas volume is above a predetermined threshold value.

23. The method of claim 22, wherein the modifying, via the controller, the operation comprises impeding the HVAC system from resuming normal operation.

24. The method of claim 22, comprising collecting and preparing via the controller, the sample when the HVAC system is idle.

25. The method of claim 22, wherein the modifying, via the controller, the operation comprises generating an alarm.

26. The method of claim 22, wherein the modifying, via the controller, the operation comprises activating one or more fans associated with ductwork of the HVAC system.

27. The method of claim 22, wherein collecting and preparing, via the controller, the sample comprises increasing a temperature of the sample before introducing the ignition source.

28. The method of claim 22, comprising measuring, via the controller, a change in the pressure of the pressurized sample after introducing the ignition source to the pressurized sample.

29. The system of claim 15, wherein the monitored gas volume is within an interior air volume of a ductwork of the HVAC system.

30. The system of claim 15, wherein the monitored gas volume is within an interior air volume of a packaging of the HVAC system.

31. The system of claim 30, wherein the interior volume is near an evaporator of the HVAC system.

* * * * *